No. 769,872. PATENTED SEPT. 13, 1904.
H. OCHWAT.
SHAFT FURNACE FOR THE COMBUSTION OR DESTRUCTION OF REFUSE.
APPLICATION FILED MAR. 16, 1901.
NO MODEL.
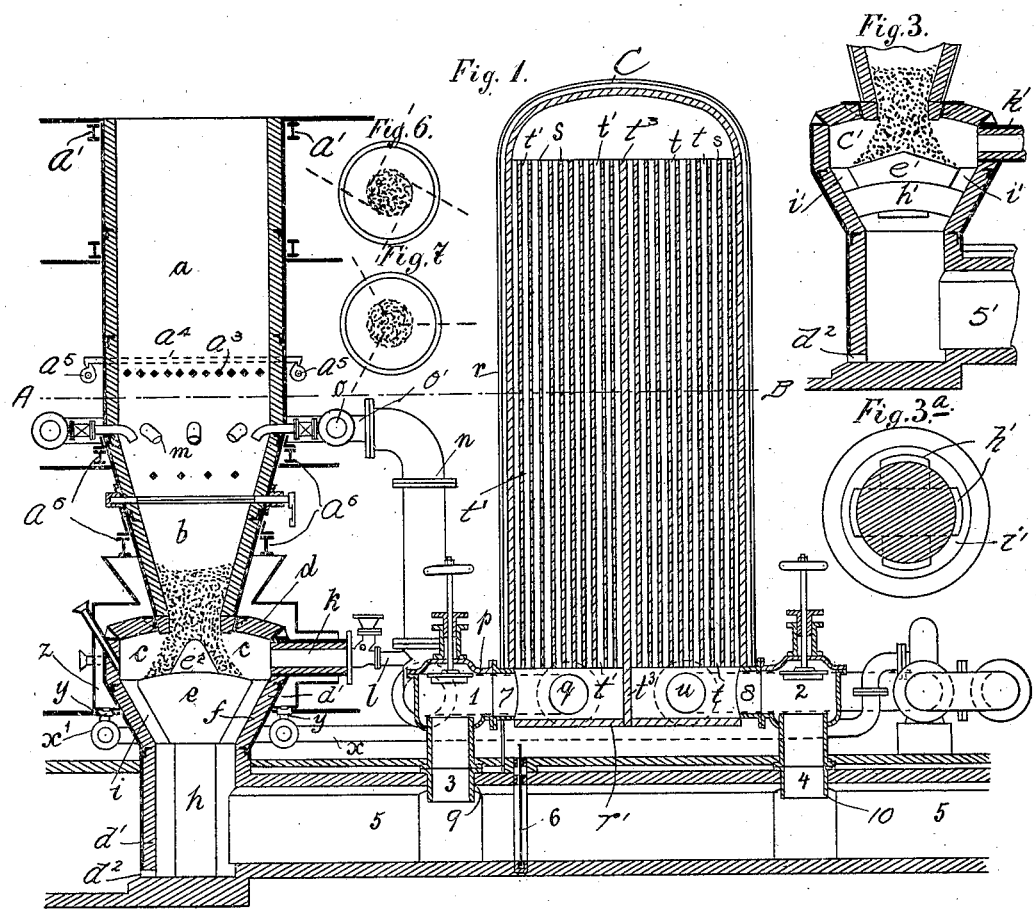
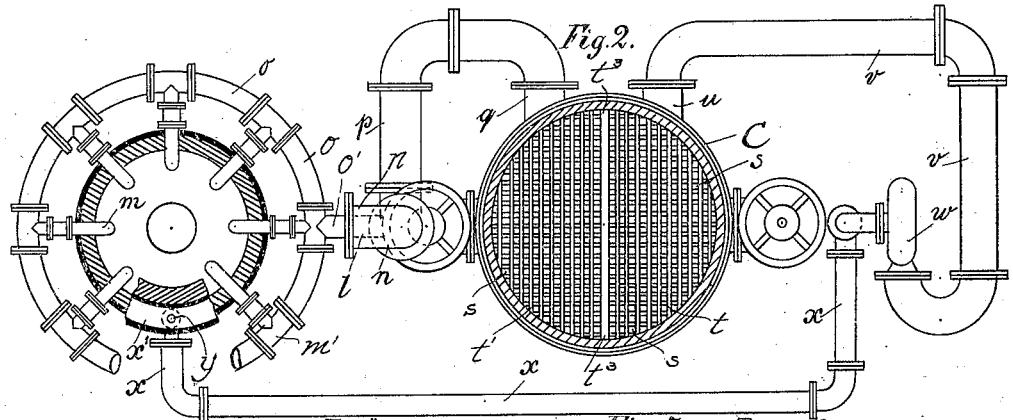
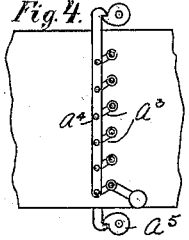
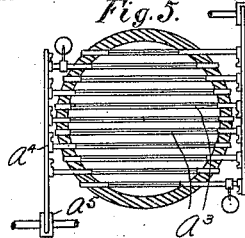
WITNESSES:
INVENTOR
Heinrich Ochwat
BY Richardson
ATTORNEYS No. 769,872.

Patented September 13, 1904.

UNITED STATES PATENT OFFICE.

HEINRICH OCHWAT, OF BERLIN, GERMANY.

SHAFT-FURNACE FOR THE COMBUSTION OR DESTRUCTION OF REFUSE.

SPECIFICATION forming part of Letters Patent No. 769,872, dated September 13, 1904.

Application filed March 16, 1901. Serial No. 51,452. (No model.)

*To all whom it may concern:*

Be it known that I, HEINRICH OCHWAT, engineer, a subject of the German Emperor, and a resident of No. 24 Fennstrasse, Berlin, in the Empire of Germany, have invented a certain new and useful Improved Shaft-Furnace for the Combustion or Destruction of Refuse, of which the following is an exact, full, and clear description.

This invention relates to a shaft-furnace for the combustion or destruction of refuse which is so constructed that the refuse drops suddenly from the shaft contracted toward the bottom into a wide combustion-chamber, into which fire-gases and air for combustion are fed, so that the refuse is subjected to the action of a hot flame completely surrounding the refuse. By this arrangement an extinction or interruption of the combustion is prevented and a complete combustion of the combustible materials, as well as a melting of the other materials, takes place.

The furnace works continuously without it being necessary to add fuel to the refuse. The fused cinders are run off periodically from a collecting-chamber. Since the fire-gases come in contact with the refuse only in the combustion-chamber, an agglomerating of the portions of refuse in the shaft of the furnace and an interruption of the feed of refuse to the combustion-chamber is obviated.

In order to further secure a uniform feed of the refuse, suitable shaking-grates or the like may be provided in the shaft.

It is also recommended to feed hot air in the shaft for the purpose of preparatorily drying the refuse and coking portions of the same which may easily burn, such as paper or the like, and also for the purpose of loosening the column of refuse.

The lower part of the shaft of the furnace may be in form of a truncated cone, so as to prevent a splitting of the column of refuse.

The combustion-gases are fed downwardly from the combustion-chamber, which during the working of the furnace assumes an annular shape by means of the refuse column itself. Consequently the heat of these gases can be again used for preparatorily drying the refuse, while for the convenient feeding or stoking of the furnace the top or throat of the same remains always cool and free from dust.

The accompanying drawings show such shaft-furnace for the destruction of refuse. Figure 1 is a longitudinal section through the shaft-furnace, the flue for the heating-gases and the air-heater, with some of the connecting-pipes shown in front elevation. Fig. 2 is a horizontal sectional view on the line A B of Fig. 1 through the shaft-furnace and the air-heater, with part section through the pipe $x'$ of the shaft-furnace and also a plan of the pipes. Figs. 3 and $3^a$ show a modification of the lower part of the shaft-furnace. Figs. 4 and 5 are details of shaking devices which are arranged within the shaft-furnace, together with means for imparting a rocking motion to said devices. Figs. 6 and 7 are views of a portion of the shaft-furnace according to Fig. 1, in which the direction of the air-current is indicated diagrammatically by the dotted lines, such air-current coming in contact with the refuse to be burned, in Fig. 6 the contact of the air-current taking place in a tangential direction and in Fig. 7 in a radial direction.

The shaft-furnace consists of a cylindrical shaft $a$, of refractory material, which is supported by suitable supports $a'$ and surrounded by metal plates. Within this cylindrical shaft $a$, which receives the refuse introduced from above, is an oscillating grate, which consists of plates $a^3$, which are moved to and fro by means of the rods $a^4$ and eccentrics $a^5$ for the purpose of imparting a continuous shaking or rocking motion to the falling refuse and preventing an agglomeration of the refuse. The cylindrical shaft extends below into a conical shaft $b$, which is constructed in the same manner as the cylindrical shaft and is adapted to concentrate the refuse upon a small surface, so that it is better subjected to the action of the heat of the gases produced during the combustion. This shaft is also supported by supports or girders $a^6$, in order that it may be prevented from moving downward. Between the cylindrical and conical shafts a number of pipes are arranged in a circle around the jacket or casing, such pipes freely communicating at one end, which is open, with the shaft and connected at the other end by T-shaped tubular pieces or sockets to an annular pipe $o$, adapted for the supply of hot air.

The above-described arrangement or construction has for its object to dry the refuse contained in the hopper and to subject same to a preliminary heating action, so that an agglomeration of the refuse is obviated and the refuse moves downward without interruption.

Underneath the conical part $b$ is the combustion-furnace proper, which is formed by the cover $d$ and the side wall $d'$. Within this furnace proper is the support $e$, with a conical elevation $e^2$ on which the material, passing out of the conical part $b$, drops and is thus uniformly distributed on the support $e$ in all directions. The support $e$ rests upon the pillar or post $h$, and so much space is available between the outer jacket or casing $d'$ $d$ and the support $e$ with its post $h$ that, on the one hand, a combustion-chamber is formed and, on the other hand, channels $i$ are produced which establish communication between the combustion-chamber $c$ and the flue 5 for the gases. This flue 5 communicates with the lower part of the chamber $i$ and is in direct communication with the chimney (not shown) and in indirect communication with the air-heater C. $d^2$ is an opening in the lower part of the combustion-chamber for the removal of ashes.

In the modification according to Figs. 3 and $3^a$ the support $e'$, on which the refuse to be burned falls, is of conical shape, so that the refuse tends, in consequence of the force of gravity, to move gradually to the side of the chamber $c'$, so that fresh refuse is continually brought near the nozzle-like inlet-openings $k'$ for the preliminary heated air-currents. The support $e'$ is fixed by means of an arcual support $h'$, which bears with its ends against the outer walls of the furnace, leaving slots or openings $i'$, which enable the combustion-gases to pass out of the combustion-chamber $c'$ into the flue $5'$.

The preliminary heated air, which is adapted for the combustion of the refuse situated on the support $e$ in the chamber $c$, passes into the chamber $c$ through the nozzles $k$, of which as many are provided as are necessary for the complete combustion of the refuse. The currents of highly-heated air which are blown under pressure through the nozzles $k$ may come in contact with the refuse either tangentially, as shown in Fig. 6, or radially, as shown in Fig. 7, the particles of air being distributed on the surface of the refuse and thereby effecting a complete combustion.

Now I will describe the path which the preliminary heated air issuing at $m$ and $k$ takes when being heated. As shown in the section of Fig. 1, the air is withdrawn from a jacket $z$, which is open above and surrounds the conical part $b$, as well as a part of the combustion-chamber for the purpose of preparatorily heating the air passing between $b$, $c$, and $z$. At the lower part of the jacket or casing $z$ are couplings $y$, which, as shown in Fig. 2, communicate with an annular channel $x'$, which is in communication with a ventilator $w$ through the medium of a pipe $x$. The air now passes through the pipe $v$ and the couplings $u$ to the air-heater C (the construction and function of which will be described later on) and then issues through the coupling $q$ in heated state and passes through pipe $p$ to the pipe $n$, from where the heated air passes, on the one hand, through pipe $l$ to the nozzles $k$ and, on the other hand, through suitable pipes $o'$ to the annular pipe $o$.

The air-heater C consists of a cylindrical vessel $r$, which is divided into two parts by a partition $t^3$, the latter extending to the bottom $r'$, but not reaching above to the cover, so that the two parts formed are connected together. Solid metal plates $s$, which are close together, are so arranged in said chambers that small spaces $t$ $t'$ are formed between the plates $s$, which allow the combustion-gases which are used to heat said plates, as well as the air to be heated, to pass therethrough. Consequently both the air to be heated and the combustion-gases rise in the one part of the vessel owing to the partition $t^3$ and descend in the other part, but in reverse directions. The feeding of the heater C with air and combustion-gas is effected successively. At the lower part of the heater C are two openings 7 8, which are connected to pipe portions carrying screw-down valves 1 2 and whose lower sockets 3 4 communicate with openings 9 10 of the flue 5. A slide 6 is provided between the sockets 3 and 4 in the flue 5 for the combustion-gases. The couplings $u$ and $q$ are provided, as already stated, for supplying and discharging the air in the air-heater.

The whole arrangement operates as follows: If the air-heater is to be heated by the combustion-gases produced in the combustion-chamber, the valves 1 and 2 of the air-heater C will be opened and the sliding door 6 of the flue 5 closed. The combustion-gases escaping from the combustion-chamber $c$ through the channels or openings $i$ to 5 do not now pass to the chimney, but through the opening 9, coupling 3, valve 1, opening 7, and through the intermediate spaces $t'$ of the plates $s$ upward, then through the intermediate spaces $t$ of the plates $s$ on the other side downward, the combustion-gases delivering all heat to the plates $s$ and, finally, through opening 8, valve 2, coupling 4, and opening 10 to the flue 5 and the chimney. When the plates $s$ of the air-heater C possess the necessary heat, the valves 1 and 2 and sliding door 6 will be closed. The combustion-gases are conveyed to the chimney, while the heater C is completely shut off below. The preparatorily-heated air withdrawn from the casing $z$ is sucked through the pipes $y$, annular pipe $x'$, pipe $x$ to the ventilator $w$, and pressed through pipe $v$, and passes through the couplings $u$ into the heater. It passes first of all into the intermediate spaces $t$ of the plates $s$ upward, then into the intermediate spaces $t'$ of the plates $s$ downward, on which path the heat of the plates $s$ is absorbed by the air, and the latter leaves the air-heater through the couplings $q$ in a highly-heated state. The heated air now passes, on the one hand, through the pipes $l$ to the nozzles $k$ of the combustion-chambers $c$ and assists the combustion of the refuse and, on the other hand, through pipe $n$ and couplings $o'$ to annular pipe $o$ and the nozzle-pipes $m$, the issuing air effecting the preparatory drying and preparatory heating of the refuse.

Two of these heaters C may preferably be arranged, of which the second is not shown because it is constructed in exactly the same manner as the first one. Care should only be taken that when in one heater the valves 1 and 2 are opened and the sliding door 6 closed the valves 1 and 3 in the other heater, when a second one is used, must be closed and the sliding door 6 opened, so that in the one heater the preparatory heating and in the other heater the feeding of the air to be preparatorily heated takes place and this manipulation of the heater is carried out alternately, so that the hot air is withdrawn first from the one heater and then from the other, and consequently a continuous feeding of the air takes place.

It will be understood that any air-heater of old form may be used, and I therefore make no claim to the air-heater herein disclosed.

The ashes can be removed through the opening $d^2$ by means of scrapers or the like.

Having now particularly described and ascertained the nature of the said invention, I declare that what I claim, and wish to secure by Letters Patent, is—

1. In combination a furnace having a combustion-chamber, said chamber having a support therein and a lower outlet for the products of combustion and having also a shaft or stack above the combustion-chamber, means for introducing heated air to the combustion-chamber at the upper surface of the support and means for introducing heated air to the stack to subject the material to a preliminary heating before it reaches the combustion-chamber, substantially as described.

2. In a furnace a combustion-chamber, an outlet for the products of combustion below the same, an air-heater, means of communication between said air-heater and the said outlet whereby the air-heater is heated from the products of combustion, means for cutting off the communication between the air-heater and outlet, a stack in the furnace above the combustion-chamber and nozzles connected with the air-heater and directed into the combustion-chamber and stack, respectively, substantially as described.

3. In combination a furnace having a conical stack with an annular combustion-chamber at the smaller lower end of the said stack, means for creating a downdraft and nozzles connected with a hot-air supply directed to the said stack at the large end of the conical portion and to the combustion-chamber, substantially as described.

In witness whereof I have hereunto set my hand in presence of two witnesses.

HEINRICH OCHWAT.

Witnesses:
 WOLDEMAR HAUPT,
 HENRY HASPER.